United States Patent
Lee et al.

(10) Patent No.: US 8,361,327 B2
(45) Date of Patent: Jan. 29, 2013

(54) AGRICULTURAL WATER-RECYCLING SYSTEM COMPRISING FE-IONIZING MODULE AND METHOD FOR RECYCLING AGRICULTURAL WATER USING THE SAME

(75) Inventors: Kwang Ya Lee, Gyeonggi-Do (KR); Hae Do Kim, Gyeonggi-Do (KR); Jong Hwa Son, Busan (KR); Min Hong, Gyeonggi-Do (KR); Kyung Sook Choi, Daegu (KR)

(73) Assignees: Korea Rural Community Corporation, Geyonggi-do (KR); Blue Environment N Tech Co., Ltd., Seoul (KR); Kyungpook National University Industry-Academic Cooperation Foundation, Daegu (KR)

( * ) Notice: Subject to any disclaimer, the term of this patent is extended or adjusted under 35 U.S.C. 154(b) by 344 days.

(21) Appl. No.: 12/697,133

(22) Filed: Jan. 29, 2010

(65) Prior Publication Data
US 2010/0264039 A1    Oct. 21, 2010

(30) Foreign Application Priority Data
Apr. 17, 2009 (KR) .................. 10-2009-0033822

(51) Int. Cl.
  *C02F 1/461*  (2006.01)
  *C02F 1/72*  (2006.01)
  *C02F 1/52*  (2006.01)
  *C25C 5/04*  (2006.01)
  *F02M 37/22*  (2006.01)

(52) U.S. Cl. .............. 210/722; 210/748.18; 210/719; 210/906; 210/205; 210/220; 210/243; 210/758; 204/247.2; 205/755; 205/761

(58) Field of Classification Search ............. 210/748.01, 210/748.16, 748.17, 748.18, 722, 719, 906, 210/205, 220, 243, 758; 204/227, 242, 277, 204/247.2; 205/742, 755, 757, 761
See application file for complete search history.

(56) References Cited

U.S. PATENT DOCUMENTS 5,368,703 A * 11/1994 Brewster ................... 205/508
2008/0223731 A1 * 9/2008 Lee ............................ 205/761

FOREIGN PATENT DOCUMENTS

| JP | 2004066223 A * | 3/2004 |
| KR | 1020050028127 | 3/2005 |
| KR | 1020070096671 | 10/2007 |

* cited by examiner

*Primary Examiner* — Christopher Upton
*Assistant Examiner* — Nader Hossaini
(74) *Attorney, Agent, or Firm* — Rabin & Berdo, P.C.

(57) ABSTRACT

The present invention relates to an agricultural water-recycling system comprising an iron (Fe)-ionizing module and a method of recycling agricultural water using the same, and more particularly to an agricultural water-recycling system comprising an iron (Fe)-ionizing module and a method of recycling agricultural water using the same, in which phosphorus (P) contained in effluent from a sewage treatment plant is removed by using the iron (Fe)-ionizing module comprising an iron (Fe)-ionizing electrode consisting of an iron plate serving as a cathode and a titanium plate serving as an anode and an electrode-washing device. According to the present invention, an effluent treatment process of a sewage treatment plant and an electrode washing process needed for iron ionization can be simultaneously performed, the iron ionization is controlled depending on the concentration of phosphorus contained in the effluent, thereby improving effluent treatment efficiency.

10 Claims, 3 Drawing Sheets

AGRICULTURAL WATER-RECYCLING SYSTEM COMPRISING FE-IONIZING MODULE AND METHOD FOR RECYCLING AGRICULTURAL WATER USING THE SAME

CROSS-REFERENCE TO RELATED APPLICATIONS

This application claims the benefit of Korean Patent Application No. 10-2009-0033822, filed on 17, Apr. 2009 in the Korean Intellectual Property Office, which is incorporated herein by reference in its entirety.

BACKGROUND OF THE INVENTION (a) Field of the Invention

The present invention relates to an agricultural water-recycling system comprising an iron (Fe)-ionizing module and a method for recycling agricultural water using the same, and more particularly to an agricultural water-recycling system comprising an iron (Fe)-ionizing module and a method for recycling agricultural water using the same, in which phosphorus (P) contained in effluent from a sewage treatment plant is removed by using the iron (Fe)-ionizing module including: an iron (Fe)-ionizing electrode consisting of an iron plate serving as a cathode and a titanium plate serving as an anode; and an electrode-washing device.

(b) Background of the Related Art

Recently, most lakes in Korea suffer from a water bloom of cyanobacteria and aggravation of water quality due to their sharp eutrophication caused in the second half of the 1980s. In particular, since farm lands and livestock farmhouses are located near the banks of all the lakes except some of small reservoirs in the mountainous regions where people don't dwell, a large amount of phosphorus is leaked enough to eutrophicate the lakes.

As a result of comparison between the generation sources of phosphorus in Korea, it is estimated that the largest amount of phosphorus is generated from a fertilizer, and an extraordinarily larger amount of phosphorus is generated from livestock than human beings. Particularly, it is reported that fertilizers and livestock excretions are main supply sources of phosphorus in the upper and middle stream areas of the lakes where a great city does not exist on their basins. The fact that the livestock becomes a main supply source of phosphorus means that since Korean Livestock Industry mostly depends upon imported animal feedstuffs, a large amount of nutrient salt is introduced externally into the basin of the lake. The livestock excretions possess the characteristics of a non-point source in that they are spread as composts over the farm lands, and then are leaked into the lake during a heavy rain fall. Thus, the main cause of eutrophication of reservoirs in Korea can be considered to be fertilizers and livestock excretions.

Since the basin of Lake Soyang is sparsely populated and has no industrial activity, contribution of point source pollution is small, and small-scaled point source pollutions are scattered with taking the characteristics of a non-point source pollution or take a form of area source pollution. This can be considered to be a typical form of a reservoir situated at the upper stream of the river in Korea, and the inflowing pattern of a non-point source pollution in the Lake Soyang basin is exemplary in Korean lakes.

The discharge rate of rivers in Korea greatly varies seasonally depending on the rainfall. In the case where a heavy downpour does not fall, the flow rate of effluent discharged from the river basin is very small, resulting in a considerable decrease in contribution to annual loads. Since there was no large rainfall during the period from 1991 to 1994, the flow rate of effluent from the river basin was small. A heavy rain whose precipitation is 100 mm fell in July 1995 after several years of drought, so that an initial effluent of the rain contained higher concentration pollutants.

Phosphorus discharged from a non-point source pollution resulting from agricultural activities occupies the majority of the entire phosphorus loads on the basins of large-scale dams in Korean. Therefore, all the attempts to prevent eutrophication of the lakes must be focused on the management of a non-point source pollution including fertilizers, livestock excretions and the like as well as the sewage treatment.

It is considered that the fertilizers and livestock excretions are an important contamination source of the river basin. Thus, a system for collecting and treating the fertilizers and livestock excretions is regarded as a target which must be invested most preferentially so as to improve water quality, and will be a secure alternative which is the most effective as an investment for improvement of water quality. Since it is nearly impossible for small-scale farmhouses to collect and treat livestock excretions, the central government and a local government must support the collection of the night soil and the construction of a night soil treatment plant. This will exhibit effects of reducing a burden for the treatment of livestock excretions of farmhouses, and simultaneously alleviating a damage burden of water quality pollution of the lower stream of the river.

A technology which has been developed so far to purify the water quality is largely classified into a chemical treatment process, a biological treatment process, a physical treatment process and an electrolytic process which has been recently developed.

As a representative technology of the electrolytic process, there is proposed a agricultural wastewater treatment method using electrolysis characterized in that wastewater is treated by means of electrochemical oxidation and electrofloatation using an iron or aluminum electrode (Korean Patent Registration No. 533,246). However, such a agricultural wastewater treatment method has an inconvenience of having to separately performing a step of alternately reversing the polarities of a pair of electrodes made of iron (Fe) or aluminum (Al) for operation and a step of washing a contaminated electrode.

The present inventor has also developed a wastewater treatment system using an iron precipitation reactor adopting an electrolysis method (Korean Patent Registration No. 787, 122). However, such a wastewater treatment system still entails a drawback in that polarities of electrodes must be switched arbitrarily and the problem of electrode pollution is not resolved.

SUMMARY OF THE INVENTION

Accordingly, the present inventors have made many efforts to the above-mentioned problems occurring in the prior art, and as a result, have found that effluent from a sewage treatment plant is treated by using an agricultural water-recycling system in which an iron (Fe)-ionizing module is constructed using an iron (Fe)-ionizing electrode consisting of an iron plate serving as a cathode and a titanium plate serving as an anode and an electrode-washing device is attached to the iron (Fe)-ionizing module, so that the necessity of arbitrarily switching the polarities of the iron (Fe)-ionizing electrode is eliminated and simultaneously the iron (Fe)-ionizing electrode is washed during the effluent treatment process, leading to prevention of pollution of the electrode to prolong the lifespan of the electrode, thereby completing the present invention.

It is an object of the present invention to provide an agricultural water-recycling system employing an iron (Fe)-ionizing module including an iron (Fe)-ionizing electrode consisting of an iron plate serving as a cathode and a titanium plate serving as an anode and an electrode-washing device, and a method for recycling agricultural water using the same.

To achieve the above objects, the present invention provides an agricultural water-recycling system comprising: (a) an influent tank (1) for allowing effluent discharged from a sewage treatment plant to be introduced thereinto; (b) an aeration tank (2) for aerating the effluent introduced thereinto from the influent tank (1); (c) an iron (Fe)-ionizing module (3) insertedly mounted at an upper end of the aeration tank (2) for removing phosphorus contained in the effluent received in the aeration tank (2); (d) a photovoltaic (PV) power generator (4) for supplying electric power to the iron (Fe)-ionizing module (3); and (e) a sedimentation tank (5) for allowing treated water from which phosphorus has been removed in the aeration tank (2) to be introduced thereinto so as to remove suspended solids (SS) contained in the treated water introduced into the sedimentation tank (5), wherein the iron (Fe)-ionizing module (3) comprises: an up/down unit (3A) mounted therein; an iron (Fe)-ionizing electrode (3B) consisting of an iron plate (cathode) and a titanium plate (anode); and an electrode-washing device (3C) attached to a lower end of the iron (Fe)-ionizing module (3).

The present invention also provides a method for recycling agricultural water using the agricultural water-recycling system, comprising simultaneously performing a process for treating an effluent of a sewage treatment plant and a process for washing the electrode.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION OF ESSENTIAL REFERENCE NUMERALS IN DRAWINGS

Figure 1:
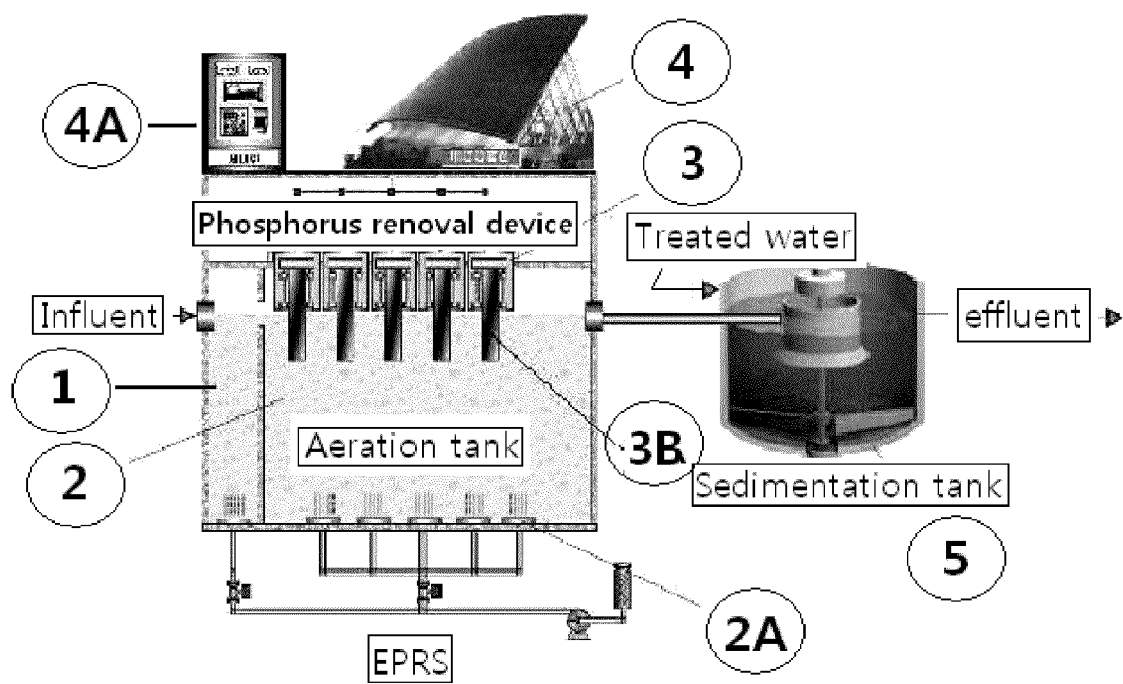
FIG. 1 is a schematic view illustrating an agricultural water-recycling system comprising an iron (Fe)-ionizing module according to the present invention.

1: influent tank
2: aeration tank
2A: air diffuser
3: iron (Fe)-ionizing module
3A: up/down unit
3B: iron(Fe)-ionizing electrode
3C: electrode-washing device
3D: guide
4: photovoltaic (pv) power generator
4A: control module
5: sedimentation tank
6: effluent tank

DETAILED DESCRIPTION OF THE PREFERRED EMBODIMENT

Hereinafter, the present invention will be described in detail.

In one aspect, the present invention relates to an agricultural water-recycling system comprising: (a) an influent tank (1) for allowing effluent discharged from a sewage treatment plant to be introduced thereinto; (b) an aeration tank (2) for aerating the effluent introduced thereinto from the influent tank (1); (c) an iron (Fe)-ionizing module (3) insertedly mounted at an upper end of the aeration tank (2) for removing phosphorus contained in the effluent received in the aeration tank (2); (d) a photovoltaic (PV) power generator (4) for supplying electric power to the iron (Fe)-ionizing module (3); and (e) a sedimentation tank (5) for allowing treated water from which phosphorus has been removed in the aeration tank (2) to be introduced thereinto so as to remove suspended solids (SS) contained in the treated water introduced into the sedimentation tank (5), wherein the iron (Fe)-ionizing module (3) comprises: an up/down unit (3A) mounted therein; an iron (Fe)-ionizing electrode (3B) consisting of an iron plate (cathode) and a titanium plate (anode); and an electrode-washing device (3C) attached to a lower end of the iron (Fe)-ionizing module (3).

The agricultural water-recycling system of the present invention mainly refers to a device which is configured to remove phosphorus, i.e., eutrophication-inducing substance contained in effluent discharged from a sewage treatment plant located at rural villages, and recycle treated water from which phosphorus has been removed as agricultural water.

The term "effluent" as used herein mainly refers to effluent discharged from a sewage treatment plant situated at rural villages, and includes livestock wastewater, agricultural wastewater, domestic wastewater from general households, etc.

Figure 3:
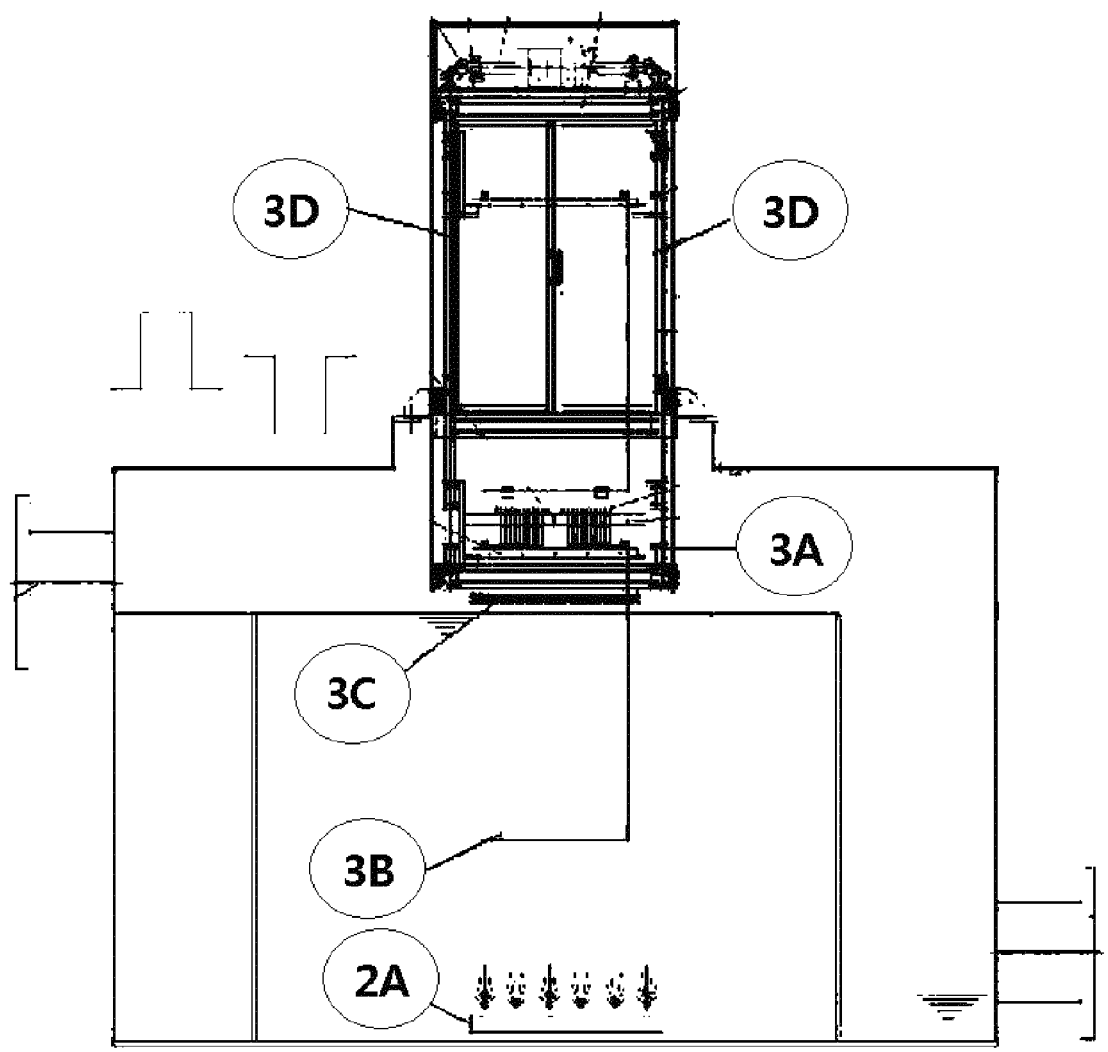
FIG. 3 is a schematic view illustrating an iron (Fe)-ionizing module according to the present invention.

FIG. 1 is a schematic view illustrating an agricultural water-recycling system including an iron (Fe)-ionizing module according to the present invention, and FIG. 3 is a schematic view illustrating an iron (Fe)-ionizing module according to the present invention.

The influent tank (1) is a water tank into which effluent discharged from a sewage treatment plant located at rural villages is introduced. Then, the effluent introduced into the influent tank (1) is moved to the aeration tank (2) connected with the influent tank (1). In this case, the connection between the influent tank (1) and the aeration tank (2) means that respective water tanks are divided by a partition wall.

The aeration tank (2) is a water tank into which the effluent is introduced from the influent tank (1). Air diffusers (2A) are mounted at an inner lower end of the aeration tank (2) and the iron (Fe)-ionizing module (3) is insertedly mounted at an upper end of the aeration tank (2).

The air diffusers (2A) promote an aeration phenomenon when a phosphorus removing process is performed so that the phosphorus removing process is conducted more efficiently.

The iron (Fe)-ionizing module (3) is inserted into the upper end of the aeration tank (2), and then is fixedly mounted by a bracket.

The iron (Fe)-ionizing module (3) starts to be operated by receiving electric power from the photovoltaic (PV) power generator (4). The iron (Fe)-ionizing module (3) may comprise the up/down unit (3A) mounted therein the iron (Fe)-ionizing module (3); the iron (Fe)-ionizing electrode (3B) mounted to the up/down unit (3A) and consisting of an iron plate (cathode) and a titanium plate (anode); and the electrode-washing device (3C) attached to a lower end of the iron (Fe)-ionizing module (3).

The up/down unit (3A) is a device which is operated while being moved upwardly and downwardly along guides (3D) vertically installed inside a box of the iron (Fe)-ionizing module (3). The term "the guide" as used herein generally refers to a guidance device which induces a movement part of a machine to be accurately operated. Herein, the guide is a device for preventing the up/down unit (3A) from being overturned or deviated from a movement path when the up/down unit (3A) is moved upwardly and downwardly.

The each guide (3D) takes a bar shape. The guide (3D) is mounted vertically inside the outer-box of the iron (Fe)-ionizing module, and its both distal ends having a bar shape are fixed by a bracket.

The iron (Fe)-ionizing electrode (3B) consists of an iron plate (cathode) and a titanium plate (anode), and is attached and joined to a distal end of the up/down unit (3A). The iron (Fe)-ionizing electrode (3B) is immersed into or escapes from the effluent received in the aeration tank (2) as the up/down unit (3A) is moved downwardly or upwardly, so that when the iron (Fe)-ionizing electrode (3B) is immersed into the effluent, it serves to remove phosphorus contained in the effluent.

The construction of the iron (Fe)-ionizing electrode (3B) will be described in more detail hereinafter.

The iron (Fe)-ionizing electrode (3B) is joined to a distal end of the up/down unit (3A) by a bracket. The iron plate is connected to a cathode, and the titanium plate is connected to an anode. The cathode and the anode of the iron (Fe)-ionizing electrode (3B) are determined when electric power is supplied to the iron (Fe)-ionizing electrode (3B) by a control panel (4A) connected to the iron (Fe)-ionizing module (3). In this case, the iron (Fe) plate acting as the cathode and the titanium plate acting as the anode may be horizontally joined to each other in an integral manner. That is, the iron (Fe)-ionizing electrode (3B) is connected with the iron plate and the titanium such as a typical electrode consisting of an anode and a cathode.

The function of the iron (Fe)-ionizing electrode (3B) will be described in more detail hereinafter.

When the iron (Fe)-ionizing electrode (3B) is immersed into the effluent received in the aeration tank (2) by the upward and downward movement of the up/down unit (3A), iron ions are eluted from the iron (Fe) plate of the iron (Fe)-ionizing electrode (3B) so that the iron ions bind to phosphorus irons contained in the effluent to produce insoluble precipitates so as to remove phosphorus contained in the effluent.

In this case, the thus produced insoluble precipitates are moved to the sedimentation tank and then are sedimented in the sedimentation tank. Thereafter, the sedimented insoluble precipitates may be removed in such a fashion as to be discharged to the outside through a drain pipe mounted at the sedimentation tank. Alternatively, the sedimented insoluble precipitates may be removed in such a fashion as to be degraded by adding microorganism sludge to the sedimentation tank.

The iron (Fe) ions are basically reacted with the phosphorus (P) irons in the ratio of 1:1 through the ion exchange. For example, when the concentration of phosphorus (P) contained in the effluence being introduced into the aeration tank is 4 ppm, the concentration of iron (Fe) required correspondingly thereto also is 4 ppm. Thus, since the amount of iron ions eluted from the iron (Fe)-ionizing electrode is proportional to the concentration of phosphorus contained in the effluent introduced into the aeration tank, the elution quantity of the iron ions can be controlled depending on the concentration of phosphorus, thereby improving efficiency of the iron (Fe)-ionizing electrode.

The effects of the iron (Fe)-ionizing electrode (3B) will be described in more detail hereinafter.

Through the function of the iron (Fe)-ionizing electrode (3B) as mentioned above, phosphorus contained in the effluent can be removed. In addition, since the iron (Fe)-ionizing electrode (3B) is composed of the iron plate as a cathode and the titanium plate as an anode, it is not required to arbitrarily reverse the polarities of the electrodes, which had to be inevitably performed in a conventional prior art in which the effluent is treated by using electrolysis. Also, the lifespan of the iron plate of the iron (Fe)-ionizing electrode can be extended up to two years, and the lifespan of the titanium plate can be used semi-permanently, such that the iron (Fe)-ionizing electrode is effective in terms of cost and process efficiency.

In the present invention, the electrode-washing device (3C) comprises a washing roller whose surface is knurled. The washing roller may be attached to a lower end of the iron (Fe)-ionizing module (3).

The construction of the electrode-washing device (3C) will be described in more detail hereinafter.

The electrode-washing device (3C) comprises a bracket mounted at a lower end of the iron (Fe)-ionizing module (3) and a washing roller. The washing roller is attached to the lower end of the iron (Fe)-ionizing module (3) by means of the bracket, and is rotatably joined to the bracket.

The function of the electrode-washing device (3C) will be described in more detail hereinafter.

When the iron (Fe)-ionizing electrode (3B) is moved vertically by the upward and downward movement of the up/down unit (3A), the washing roller washes the electrode plate while rotating and slip of the electrode plate is prevented by the knurling of the surface of the washing roller.

Meanwhile, the washing roller is connected with two rollers at both distal ends thereof in a parallel manner. The iron (Fe)-ionizing electrode is moved vertically while passing between the two rollers, and simultaneously the washing of the electrode is performed.

The effects of the electrode-washing device (3C) will be described in more detail hereinafter.

Since the electrode-washing device (3C) can wash the iron (Fe)-ionizing electrode along with the operation of the iron (Fe)-ionizing module (3), a separate washing process is not required, thereby prolonging the lifespan of the iron (Fe)-ionizing electrode. In addition, the washing of the iron (Fe)-ionizing electrode is needed in order to elute a proper quantity of iron ions from the iron (Fe)-ionizing electrode depending on the concentration of phosphorus (P) contained in the effluent introduced into the aeration tank (2). Resultantly, it can be found that the efficiency of the iron (Fe)-ionizing electrode is improved by the electrode-washing device.

The photovoltaic (PV) power generator (4) is a device which supplies electric power to the iron (Fe)-ionizing module (3) to allow the iron (Fe)-ionizing module (3) to be operated. The photovoltaic (PV) power generator (4) and the iron (Fe)-ionizing module (3) are connected to each other by means of a control panel (4A). In this case, the control panel (4A) functions to control the quantity of electric power supplied to the iron (Fe)-ionizing module (3) from the photovoltaic (PV) power generator (4), the power supply time and the like.

Here, the connection between the photovoltaic (PV) power generator and the control panel and the connection between iron (Fe)-ionizing module and the control panel is made by a general cable through which electric power can be supplied. This will be obvious to those skilled in the art.

The sedimentation tank (5) is a water tank which is connected to the aeration tank (2) for allowing treated water as effluent from which phosphorus has been removed in the aeration tank (2) to be introduced thereinto. The sedimentation tank (5) removes suspended solids through precipitation of suspended solids contained in the treated water introduced into and staying in the sedimentation tank (5). In this case, the sedimentation tank may include a drain pipe mounted therein so as to discharge the suspended solid precipitates to the outside, and may have microorganism sludge added thereto so as to remove the suspended solids by degradable action.

Figure 2:
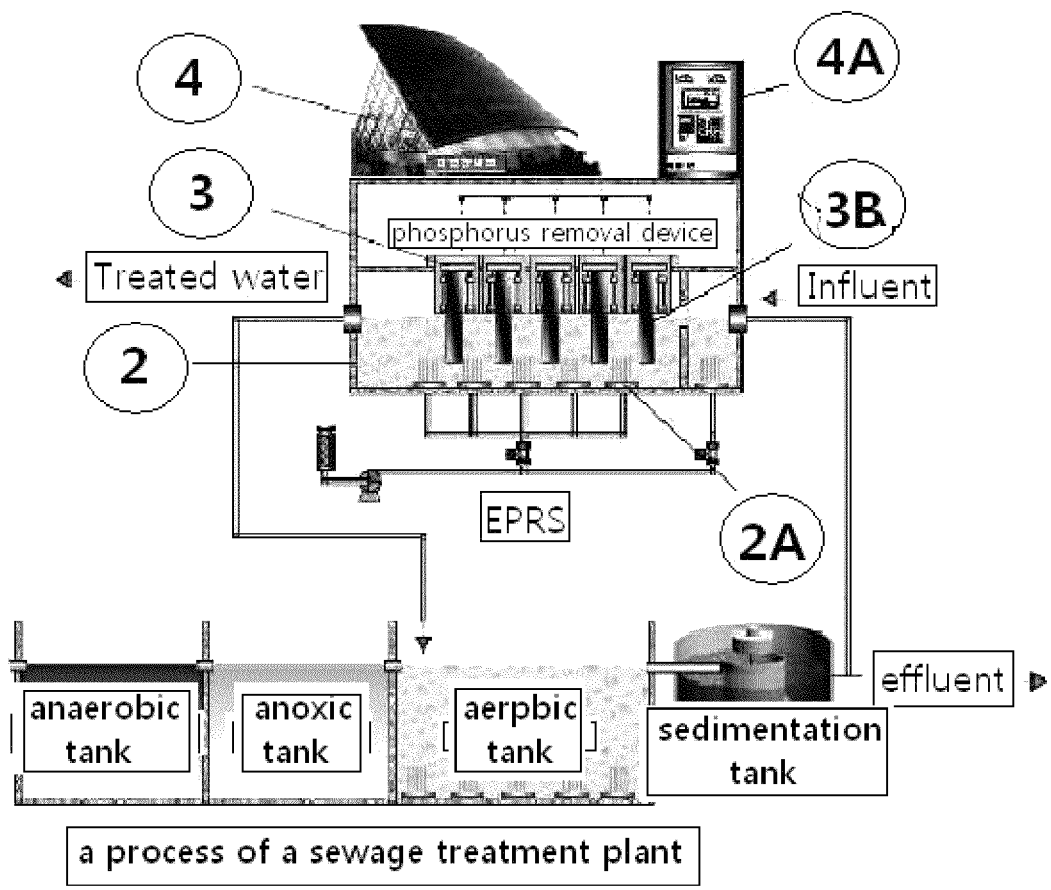
FIG. 2 is a schematic view illustrating an example in which an agricultural water-recycling system comprising an iron (Fe)-ionizing module according to the present invention is applied to a conventional agricultural water-recycling system comprising an anaerobic tank, an anoxic tank, an aerobic tank and a sedimentation tank.

FIG. 2 is a schematic view illustrating an example in which an agricultural water-recycling system comprising an iron (Fe)-ionizing module according to the present invention is applied to a conventional agricultural water-recycling system comprising an anaerobic tank, an anoxic tank, an aerobic tank and a sedimentation tank.

The iron (Fe)-ionizing module according to the present invention may be applied to the agricultural water-recycling system comprising the anaerobic tank, the anoxic tank, the aerobic tank and the sedimentation tank. More specifically, an agricultural water-recycling system may be implemented, which comprising: an aeration tank is connected to the aerobic tank and the sedimentation tank with the aeration tank interposed therebetween for aerating effluent introduced thereinto from the sedimentation tank; an iron (Fe)-ionizing module (3) insertedly mounted at an upper end of the aeration tank for removing phosphorus contained in the effluent received in the aeration tank by using an iron (Fe)-ionizing electrode (3B) included therein; and a photovoltaic (PV) power generator (4) connected to the iron (Fe)-ionizing module (3) for supplying electric power to the iron (Fe)-ionizing module (3).

In other words, according to a conventional agricultural water-recycling system, the effluent having passed through the anaerobic tank, the anoxic tank, the aerobic tank and the sedimentation tank in this order is introduced into the aeration tank where phosphorus contained in the effluent is in turn removed by the iron (Fe)-ionizing module (3). Thereafter, the phosphorus-removed effluent flows into the aerobic tank where phosphorus is in turn re-removed, thereby enhancing phosphorus-removal efficiency.

In another aspect, the present invention relates to a method for recycling agricultural water using the agricultural water-recycling system, comprising simultaneously performing a process for treating an effluent of a sewage treatment plant and a process for washing the electrode.

Specifically, the agricultural water-recycling method is a method in which phosphorus contained in the effluent is removed while controlling the elution quantity of iron ions using the iron (Fe)-ionizing electrode (3B) consisting of an iron plate (cathode) and a titanium plate (anode), and simultaneously the effluent is treated while washing the iron (Fe)-ionizing electrode using the electrode-washing device.

Consequently, the agricultural water-recycling method enables simultaneous conduction of the electrode washing process and the effluent treatment process even without separately performing a process of having to arbitrarily switching the polarities of the electrode and a process of washing the electrode, thereby increasing effluent treatment efficiency.

EXAMPLE

Hereinafter, the present invention will be described in further detail with reference to examples. It will be obvious to those skilled in the art that these examples are illustrative purposes only and are not to be construed to limit the scope of the present invention.

Example 1

1 Measurement of Effluent Treatment Efficiency of the Agricultural Water-Recycling System including the Iron (Fe)-Ionizing Module Village sewage was allowed to flow into the agricultural water-recycling system including the iron (Fe)-ionizing module as shown in FIG. 1 and then was purified. Village sewage of Daegu city was used as water to be treated, and the capacity of village sewage introduced into the agricultural water-recycling system was set to 50 ton/day. The electric power supplied by the photovoltaic (PV) power generator was set to 1 kW so as to operate the agricultural water-recycling system.

In the experiment below, village water flowing into the agricultural water-recycling system is referred to as "influent", and village water finally purified by the agricultural water-recycling system is referred to as "agricultural recycled water".

1-1. Measurement of Phosphorus Removal Efficiency

As a measurement result of the concentrations of phosphorus (P) (total phosphorus (T-P)) contained in each of influent and agricultural recycled water, it could be found from Table 1 below that the phosphorus removal efficiency exhibited by the agricultural water-recycling system according to the present invention was above 90%.

TABLE 1

| Influent (T-P) | Agricultural Recycled Water (T-P) | Removal Rate (%) |
|---|---|---|
| 4.47 | 0.26 | 94 |
| 4.07 | 0.29 | 93 |
| 4.09 | 0.29 | 93 |
| 4.06 | 0.26 | 93 |

As described above, according to the present invention, an effluent treatment process of a sewage treatment plant and an electrode washing process needed for iron ionization can be simultaneously performed, the iron ionization is controlled depending on the concentration of phosphorus contained in the effluent, thereby improving effluent treatment efficiency.

While the present invention has been described in detail with reference to specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. An agricultural water-recycling system, comprising:
an influent tank configured to allow an effluent discharged from a sewage treatment plant to be introduced thereinto;
an aeration tank configured to aerate the effluent introduced thereinto from the influent tank;
an iron (Fe)-ionizing module insertedly mounted at an upper end of the aeration tank for removing phosphorus contained in the effluent received in the aeration tank;
a photovoltaic (PV) power generator configured to supply electric power to the iron (Fe)-ionizing module; and a sedimentation tank configured to allow treated water from which phosphorus has been removed in the aeration tank to be introduced thereinto so as to remove suspended solids (SS) contained in the treated water introduced into the sedimentation tank, wherein the iron (Fe)-ionizing module comprises
an up/down unit mounted therein;
an iron (Fe)-ionizing electrode consisting of an iron plate and a titanium plate; and
an electrode-washing device attached to a lower end of the iron (Fe)-ionizing module.

2. The system according to claim 1, wherein an air diffuser is built in order to aerate by supplying air in the bottom of the inter aeration tank.

3. The system according to claim 1, wherein the iron (Fe) plate and the titanium plate of the iron (Fe)-ionizing electrode are combined by integral manner horizontally.

4. The system according to claim 1, wherein the electrode-washing device comprises a washing roller whose surface is knurled.

5. The system according to claim 4, wherein the washing roller is connected with two rollers at both distal ends thereof in a parallel manner.

6. A method for recycling agricultural water using an agricultural water-recycling system, the method comprising:
simultaneously performing a process for treating an effluent of a sewage treatment plant and a process for washing the electrode,
wherein the agricultural water-recycling system comprises
an influent tank configured to allow an effluent discharged from a sewage treatment plant to be introduced thereinto;
an aeration tank configured to aerate the effluent introduced thereinto from the influent tank;
an iron (Fe)-ionizing module insertedly mounted at an upper end of the aeration tank for removing phosphorus contained in the effluent received in the aeration tank;
a photovoltaic (PV) power generator configured to supply electric power to the iron (Fe)-ionizing module; and
a sedimentation tank configured to allow treated water from which phosphorus has been removed in the aeration tank to be introduced thereinto so as to remove suspended solids (SS) contained in the treated water introduced into the sedimentation tank,
wherein the iron (Fe)-ionizing module comprises
an up/down unit mounted therein;
an iron (Fe)-ionizing electrode consisting of an iron plate and a titanium plate; and
an electrode-washing device attached to a lower end of the iron (Fe)-ionizing module.

7. The method according to claim 6, wherein an air diffuser is built in order to aerate by supplying air in the bottom of the inter aeration tank.

8. The method according to claim 6, wherein the iron (Fe) plate and the titanium plate of the iron (Fe)-ionizing electrode are combined by integral manner horizontally.

9. The method according to claim 6, wherein the electrode-washing device comprises a washing roller whose surface is knurled.

10. The method according to claim 9, wherein the washing roller is connected with two rollers at both distal ends thereof in a parallel manner.

* * * * *